United States Patent [19]
Song

[11] Patent Number: 6,141,473
[45] Date of Patent: Oct. 31, 2000

[54] OPTICAL FIBER COMPOSITE GROUND WIRE

[75] Inventor: Pil-soo Song, Kyungsangbuk-do, Rep. of Korea

[73] Assignee: Samsung Electronics Co., Ltd., Kyungki-Do, Rep. of Korea

[21] Appl. No.: 09/109,201

[22] Filed: Jul. 2, 1998

[30] Foreign Application Priority Data

Aug. 14, 1997 [KR] Rep. of Korea ...................... 97-38906

[51] Int. Cl.⁷ .................................................. G02B 6/44
[52] U.S. Cl. ........................................... 385/114; 385/109
[58] Field of Search .................................... 385/100, 101, 385/109, 112, 114

[56] References Cited

U.S. PATENT DOCUMENTS

| | | |
|---|---|---|
| 4,416,508 | 11/1983 | Dey et al. . |
| 4,699,461 | 10/1987 | Taylor et al. . |
| 4,709,984 | 12/1987 | Oestreich et al. . |
| 4,895,427 | 1/1990 | Kraft . |
| 5,229,851 | 7/1993 | Rahman ................... 385/114 |
| 5,249,249 | 9/1993 | Eoll et al. ................ 385/114 |
| 5,369,720 | 11/1994 | Parry et al. .............. 385/114 |
| 5,384,880 | 1/1995 | Keller et al. ............. 385/109 |
| 5,408,562 | 4/1995 | Yoshizawa et al. ...... 385/112 |
| 5,509,097 | 4/1996 | Tondi-Resta et al. .... 385/113 |
| 5,561,729 | 10/1996 | Parris ..................... 385/113 |
| 5,638,478 | 6/1997 | Iwakura et al. ......... 385/111 |
| 5,761,363 | 6/1998 | Mills ...................... 385/114 |

FOREIGN PATENT DOCUMENTS 9618631  6/1996  Rep. of Korea .

*Primary Examiner*—James Phan
*Attorney, Agent, or Firm*—Leydig, Voit & Mayer, Ltd.

[57] ABSTRACT

An optical fiber composite ground wire includes a core having channels, loose tubes, each tube containing at least one ribbon optical fiber, and disposed in a respective channel, and external tensile wires surrounding the core. Since the optical fibers collected in the tube are the same in length, tension and breakage due to differences in length between the optical fibers can be prevented. Also, since ribbon optical fibers each having 2 to 8 cores are gathered in the loose tube, more than 12 cores can be assembled in the tube without special equipment. A UV-curable resin coating the outer surface of the ribbon optical fiber prevents water from permeating into the optical fibers and affecting optical characteristics.

5 Claims, 2 Drawing Sheets

OPTICAL FIBER COMPOSITE GROUND WIRE

BACKGROUND OF THE INVENTION

1. Field of the Invention

The present invention relates to an optical fiber composite ground wire, and more particularly, to an optical fiber composite ground wire by which the probability of breakage due to a difference in length between optical fibers in a tube can be reduced, and which can easily contain more optical fiber core wires without needing more special equipment.

2. Description of the Related Art

An electric wire line may be an underground line or an overhead line. In regions other than cities, an overhead line is usually used to transmit electricity. Since lightning can directly hit the overhead line, a wire, called an overhead ground wire, is installed along the uppermost portion of the line to serve as a lightning rod. Meanwhile, a communication line is needed for the electric line. In particular, communication lines for remote observation, remote control, etc. must be installed on an electric transmission line. An overhead ground wire and communication line can be installed separately, but they are preferably incorporated into one body.

However, a typical conductor such as copper or aluminum impedes the aforementioned incorporation, since a power line near a communication line hinders communication by inducing current. The communication trouble is proportional to the voltage and current of the power line, and is inversely proportional to the distance between the communication line and the power line. In particular, an electric transmission line carrying a high current at hundreds of thousands of volts causes a strong impediment to communications a communication line in its neighborhood. Nevertheless, it is inevitable to install the communication line on the electric transmission line.

In order to solve the above problem, an optical fiber composite ground wire (OPGW) has been developed. FIG. 1 is a cross-sectional view of a conventional optical fiber composite ground wire including a core 1 through which a plurality of channels are formed, a loose tube 3 inserted in the channel, and an external tension line 8 surrounding the core. At least one optical fiber 4 coated with acryl is housed in each loose tube 3. A gel-type filling material (not shown) for preventing entry of water fills the space between the optical fiber 4 and the loose tube 3 and surrounds the loose tube 3 in the channel 2. The external tension line 8 is comprised of a steel wire 6 for providing a strong tensile strength, and a coating 7 of highly conductive aluminum.

As shown in FIG. 1, the conventional optical fiber composite ground wire includes the external tension line 8 serving as an existing overhead ground wire, and the optical fiber 4 used as a communication path. In particular, the optical fiber greatly reduces the communication trouble compared to a communication line using an electrical signal.

However, in the optical fiber composite ground wire shown in FIG. 1, differences in the lengths of the optical fibers can cause them to break. The standard interval between power transmission steel towers is 600 meters. Accordingly, when the optical fiber composite ground wire is installed between the steel towers which are widely spaced, as described above, the optical fiber receives a strong tensile force due to its own weight. In this case, optical fibers receiving a relatively strong tensile force are likely to break, since they have significantly low elasticity and tensile strength, unlike the copper or aluminum used as the material of the typical power line. As shown in FIG. 1, if the optical fibers are irregularly inserted into the loose tube when the external tension line 8 and the core 1 stretch, some optical fibers are likely to receive a stronger tensile force than others. That is, even though the optical fibers are inserted giving consideration to the elongation of the entire overhead ground wire, some optical fibers may receive a strong tensile force.

Breakage of the optical fibers due to the above-described reasons is inevitable, and causes communication trouble. In particular, when the communication line is for remote observation or remote control of the power transmission line, great confusion may occur in the power transmission system, thus requiring an optical fiber composite ground wire more resistant to breakage of optical fibers.

Meanwhile, the loose tube usually contains 6 to 12 optical fibers. More than this number of optical fibers needs special equipment for assemble the optical fibers, which is expensive. An alternative to increasing the number of optical fibers in each tube is to increase the number of channels in the core 1. However, this weakens the overhead ground wire. On the other hand, if the outer diameter of the wire is enlarged, the safety of the steel tower deteriorates due to an increase in the weight of the wire.

SUMMARY OF THE INVENTION

To solve the above problems, it is an objective of the present invention to provide an optical fiber composite ground wire by which the probability of breakage due to a difference in length between optical fibers in a tube is reduced, and which can easily contain more optical fiber core wires without needing more special equipment.

Accordingly, to achieve the above objective, there is provided an optical fiber composite ground wire comprising: a core which has a plurality of holes formed therethrough; loose tubes which each contain at least one ribbon optical fiber and are inserted into the holes; and external tensile wires which surround the core.

The ribbon optical fiber is a horizontal array of at least two optical fibers at equal intervals. Preferably, the optical fibers are held together by an ultraviolet(UV)-curable resin.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
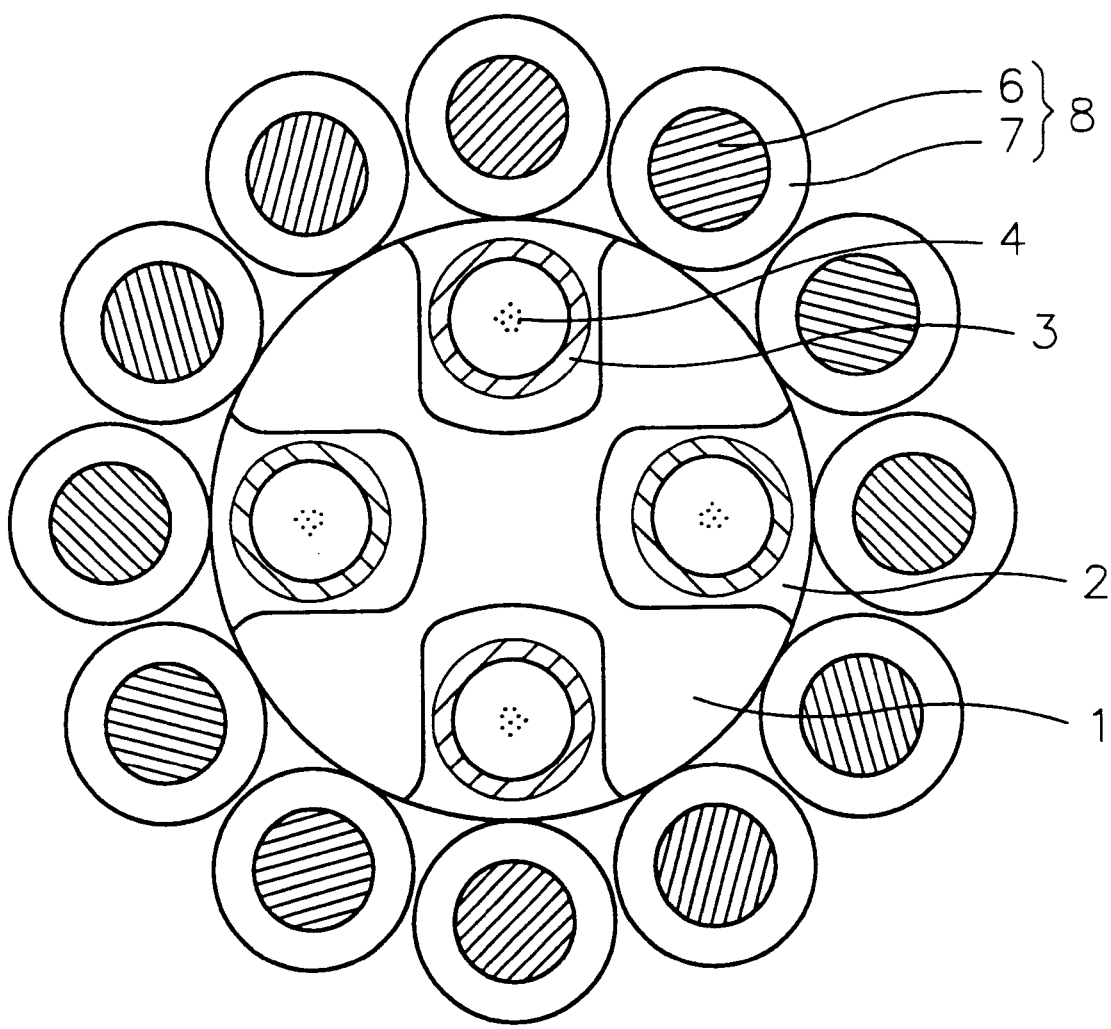
FIG. 1 is a cross-sectional view of a conventional optical fiber composite ground wire.
Figure 2:
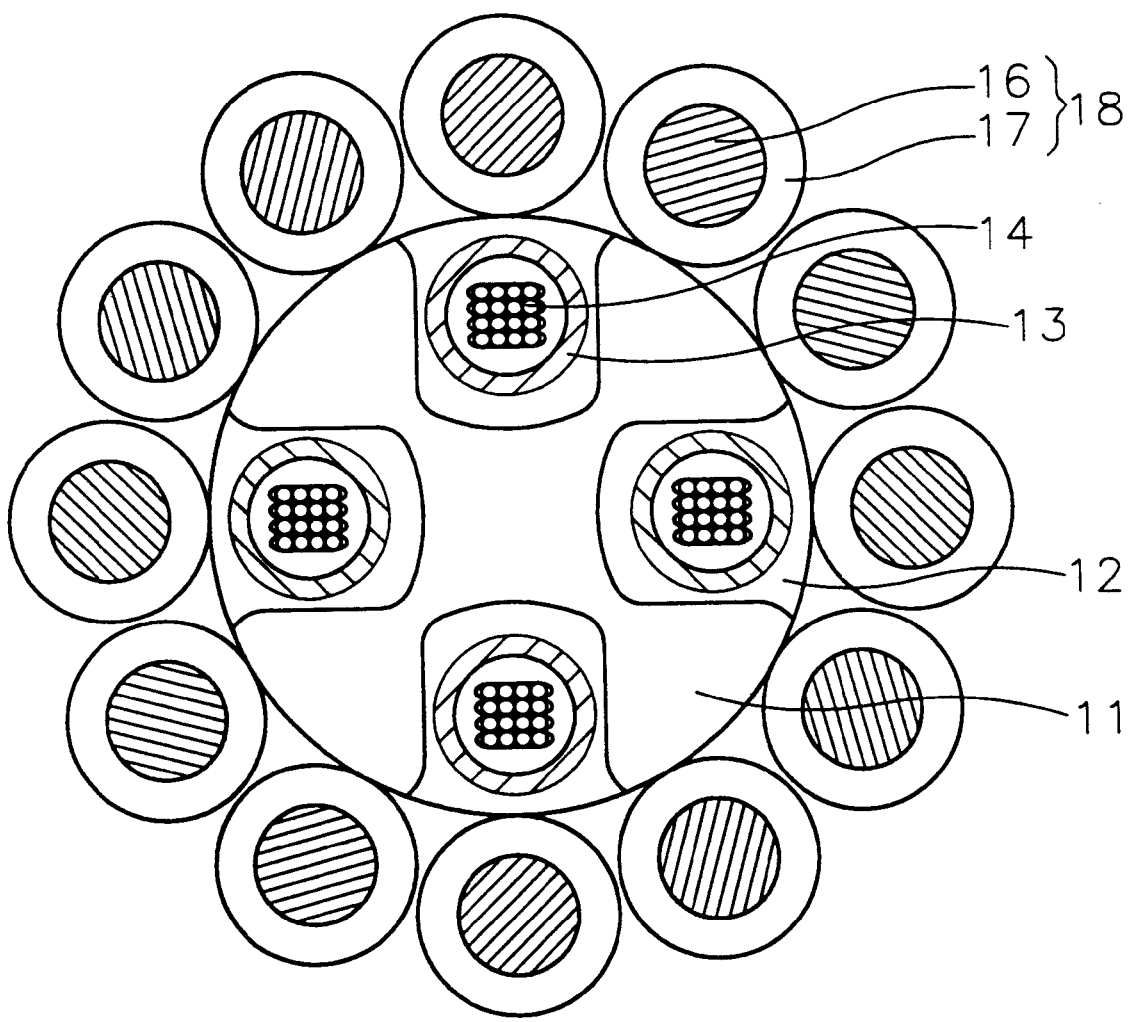
FIG. 2 is a cross-sectional view of an optical fiber composite ground wire according to an embodiment of the present invention.

Referring to FIG. 2, an optical fiber composite ground wire according to an embodiment of the present invention comprises a core 11 through which a plurality of channels 12 pass, loose tubes 13 inserted into respective channels, and external tensile lines 18 surrounding the core 11. The core 11 protects optical fibers inserted into the channels from external impacts or compression, and is made of aluminum or an alloy of aluminum. It is preferable that a gel-type filling material (not shown) for preventing entry of water fill the space between a ribbon optical fiber 14 and the loose tube 13 and surround the loose tube 13 in the channel 12. Generally that the channel 12 has a spiral shape. The external tensile line 18 has a steel core 16 for providing high tensile strength, and a coating 17 made of a highly conductive material, which prevents the steel core from corroding, such as aluminum.

According to the present invention, the ribbon optical fibers 14 are stacked in the loose tube 13. Each ribbon optical fiber 14 is an array of a plurality of optical fibers, and preferably, each of the optical fibers is coated with acryl. It is preferable that the loose tube 13 is manufactured by the following method.

First, at least two optical fibers are horizontally arrayed at equal intervals, and the empty spaces between the optical fibers are filled with a UV-curable resin, and, simultaneously, the outer surface of the arrayed optical fibers is coated a constant thickness. After coating, the UV-curable resin is cured by irradiation with ultraviolet (UV) rays. The cured resin strongly joins the optical fibers, thus reducing the probability of developing a difference in length between the optical fibers when inserting the optical fibers into the loose tube. Also, the cured resin prevents entry of water, and protects the optical fibers from external impacts.

After the above process, the ribbon optical fibers are manufactured, each preferably having two to eight fiber cores. The ribbon optical fibers are installed in the loose tube. When assembling at least two ribbon optical fibers, they are stacked and gathered, and then the gathered ribbon optical fibers are installed in the loose tube. As described above, when several ribbon optical fibers are stacked, more than 12 optical fibers collect in the loose tube. It is preferable that a gel-type filling material for preventing entry of water be injected upon gathering of the ribbon optical fibers. The filling material fills the empty space between the ribbon optical fiber and the loose tube, thereby preventing water from permeating into the ribbon optical fiber. Also, the filling material is a type of gel which serves as a buffer layer for protecting the optical fibers from external impacts. According to the present invention, the ribbon optical fibers are preferably coated with a plastic resin before installing the ribbon optical fibers into the loose tube.

The completed loose tube is inserted into the hole of the core. As described above, the optical fiber composite ground wire receives a strong tensile force during installation or in use, so that some stretch is inevitable. If the optical fibers receive a tensile force during stretching, they are prone to break. Thus, even though the optical fiber composite ground wire is stretched, the optical fibers must be gathered to have sufficient extra length enough to prevent the tensile force. According to the present invention, since the ribbon optical fiber consisting of equally-arrayed optical fibers is installed in the loose tube, there is much less probability of receiving a strong tensile strength due to the insufficient extra length of a specific optical fiber, upon stretching of the optical fiber composite ground wire. If the loose tube collects water in the channel, it is preferable that the empty space in the channel is filled with a gel-type filling material and then the filling material is solidified.

Finally, the core containing the loose tubes is wrapped in the external tensile wires. The external tensile wires protect the optical fibers from external impacts and compression. Also, the external tensile wires give the optical fiber composite ground wire tensile strength, and the excellent conductivity necessary to serve as a ground wire.

As can be seen from the above, the optical fiber composite ground wire according to the present invention has the following advantages.

First, since the optical fibers collected in the tubes are all the same length, tension and breakage due to differences in length between the optical fibers can be prevented.

Second, since optical fiber ribbons each having 2 to 8 cores are gathered in the loose tube, more than 12 fiber cores can be assembled in the tube without special equipment.

Third, a curable resin coating the outer surface of the ribbon optical fiber prevents water from permeating the optical fibers, and affecting the optical characteristics.

What is claimed is:

1. An optical fiber composite ground wire comprising:
    a core including a plurality of channels passing therethrough;
    loose tubes, each tube being located in a respective channel;
    a plurality of stacks of ribbon optical fibers, each ribbon optical fiber including a plurality of optical fibers arranged and joined together side-by-side in a planar array, each stack including a plurality of the ribbon optical fibers gathered and assembled in a stack, one of the stacks being disposed in each of the loose tubes; and
    external tensile wires surrounding the core whereby the optical fibers withstand tensile forces applied to the composite ground wire.

2. The optical fiber composite ground wire as claimed in claim 1, wherein the optical fibers in a ribbon optical fiber are held together by an ultraviolet-curable resin.

3. The optical fiber composite ground wire as claimed in claim 1, wherein each ribbon optical fiber is surrounded by a plastic resin.

4. The optical fiber composite ground wire as claimed in claim 1, including a filling material for preventing entry of water, disposed between a ribbon optical fiber stack and the loose tube containing the ribbon optical fiber stack.

5. The optical fiber composite ground wire as claimed in claim 1, wherein the external tensile wires are steel wires coated with aluminum.

* * * * *